US008155650B2

(12) United States Patent
Iyer et al.

(10) Patent No.: US 8,155,650 B2
(45) Date of Patent: Apr. 10, 2012

(54) METHOD AND SYSTEM FOR SELECTIVE BUFFERING

(75) Inventors: Jayaraman R. Iyer, Sunnyvale, CA (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 11/465,239

(22) Filed: Aug. 17, 2006

(65) Prior Publication Data

US 2008/0043618 A1 Feb. 21, 2008

Related U.S. Application Data

(60) Provisional application No. 60/774,493, filed on Feb. 17, 2006.

(51) Int. Cl.
| | |
|---|---|
| *H04J 1/16* | (2006.01) |
| *H04L 12/28* | (2006.01) |
| *H04L 12/16* | (2006.01) |
| *H04B 7/216* | (2006.01) |
| *H04B 7/00* | (2006.01) |
| *H04B 1/38* | (2006.01) |
| *H04W 4/00* | (2009.01) |
| *H04W 36/00* | (2009.01) |
| *H04M 3/42* | (2006.01) |
| *G06F 15/16* | (2006.01) |
| *H04N 7/14* | (2006.01) |

(52) U.S. Cl. ........ 455/436; 370/412; 370/342; 370/260; 370/310; 370/329; 370/331; 370/230; 455/557; 455/442; 455/415; 709/227; 709/204; 348/14.09; 348/14.08

(58) Field of Classification Search .................. 370/230, 370/412; 455/436
See application file for complete search history.

(56) References Cited

U.S. PATENT DOCUMENTS

| | | | |
|---|---|---|---|
| 6,332,153 B1 | 12/2001 | Cohen | 709/204 |
| 6,791,957 B2* | 9/2004 | Kim | 370/331 |
| 6,981,047 B2 | 12/2005 | Hanson et al. | 709/227 |
| 6,989,856 B2 | 1/2006 | Firestone et al. | 348/14.09 |
| 7,039,027 B2 | 5/2006 | Bridgelall | 370/329 |
| 7,054,268 B1 | 5/2006 | Paranteinen et al. | 370/231 |
| 7,151,758 B2 | 12/2006 | Kumaki et al. | 370/331 |
| 7,266,091 B2 | 9/2007 | Singh et al. | 370/260 |
| 7,333,451 B1* | 2/2008 | Khalil et al. | 370/331 |
| 2002/0045450 A1* | 4/2002 | Shimizu et al. | 455/442 |
| 2005/0099492 A1 | 5/2005 | Orr | 348/14.08 |
| 2006/0007862 A1* | 1/2006 | Sayeedi et al. | 370/235 |

(Continued)

OTHER PUBLICATIONS

PCT; International Search Report and Written Opinion; (IS/US) for PCT/US2008/55405 (8 pages), Jun. 5, 2008.

(Continued)

*Primary Examiner* — Dwayne Bost
*Assistant Examiner* — Timothy Pham
(74) *Attorney, Agent, or Firm* — Baker Botts L.L.P.

(57) ABSTRACT

A method for selective buffering includes establishing a first connection with a mobile endpoint. The first connection provides for an exchange of data with the mobile endpoint via a first point of connection. The mobile endpoint is coupled to the first point of connection via a second connection. The method also includes characterizing the data exchanged with the mobile endpoint, and determining whether to buffer the data based on the characterization of the data. The method further includes receiving a request to transfer the mobile endpoint from the first point of connection to a second point of connection. The method also includes determining whether to forward the buffered data to the second point of connection based on the characterization of the data.

41 Claims, 1 Drawing Sheet

U.S. PATENT DOCUMENTS

| | | | |
|---|---|---|---|
| 2006/0095943 A1* | 5/2006 | Demircin et al. | 725/81 |
| 2006/0142008 A1* | 6/2006 | Lee et al. | 455/436 |
| 2006/0193272 A1* | 8/2006 | Chou et al. | 370/310 |
| 2006/0251038 A1 | 11/2006 | Tamura et al. | 370/342 |
| 2006/0264207 A1 | 11/2006 | Tamura et al. | 455/415 |
| 2007/0014259 A1* | 1/2007 | Fajardo et al. | 370/331 |
| 2007/0281743 A1* | 12/2007 | Palin et al. | 455/557 |
| 2009/0163207 A1* | 6/2009 | Randall et al. | 455/436 |

OTHER PUBLICATIONS

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

* cited by examiner

METHOD AND SYSTEM FOR SELECTIVE BUFFERING

CROSS REFERENCE TO RELATED APPLICATIONS

This application claims priority under 35 U.S.C. §119 of provisional application No. 60/774,493 filed Feb. 17, 2006 entitled "System and Method for Packet Processing During Mobility".

TECHNICAL FIELD OF THE INVENTION

This invention relates generally to networking systems and, more particularly, to a method and system for selective buffering.

BACKGROUND

As the internet continues to grow in popularity and pervasiveness so do the products and services that use it. One of the ways in which these emerging products and services are accessing the internet (as well as other networks) is through the use of wireless connections. Mobile endpoints provide users with access to a network without being tied down to a single location. In order to provide the ability for a mobile endpoint to access the network over a large area multiple points of connection may be required. As the endpoint moves around the large area its signal may grow weaker at one point of connection while growing stronger at another point of connection. At some point it may be desirable to transfer the mobile endpoint from the first point of connection to the second point of connection. This handoff can include both packet loss and latency. These undesirable effects caused by moving between base stations in a wireless network create a poor user experience. A typical solution is to buffer and forward the data being sent to the mobile endpoint both during and after the handoff.

SUMMARY

In accordance with particular embodiments, a method and system for alert throttling in media quality monitoring is provided, which substantially eliminates or reduces the disadvantages and problems associated with previous systems and methods.

In accordance with a particular embodiment of the present invention, a method for selective buffering includes establishing a first connection with a mobile endpoint. The first connection provides for an exchange of data with the mobile endpoint via a first point of connection. The mobile endpoint is coupled to the first point of connection via a second connection. The method also includes characterizing the data exchanged with the mobile endpoint, and determining whether to buffer the data based on the characterization of the data. The method further includes receiving a request to transfer the mobile endpoint from the first point of connection to a second point of connection. The method also includes determining whether to forward the buffered data to the second point of connection based on the characterization of the data.

In some embodiments the method may also include buffering the data locally and sending a request to the first point of connection requesting that the first point of connection buffer the data.

In particular embodiments, determining whether to buffer the data based on the characterization of the data may include determining whether to buffer the data at the first point of connection and locally, or at the first point of connection, or locally, or neither locally nor at the first point of connection, based on the characterization of the data.

In some embodiments characterizing the data exchanged with the mobile endpoint may include characterizing a type of service provided via the data. In particular embodiments the data is buffered if the type of service provided is a service selected from the group consisting of a time-insensitive service and a delay insensitive service. In some embodiments the data exchanged with the mobile endpoint may be characterized using a resource selected from the group consisting of a link layer procedure, a policy lookup, and at least one local configuration decision.

In accordance with another embodiment, a method for selective buffering includes establishing a first connection with a mobility anchor point and a second connection with a mobile endpoint. The method also includes relaying data between the mobile endpoint and the mobility anchor point. Additionally, the method includes characterizing the data relayed between the mobile endpoint and the mobility anchor point and determining whether to buffer the data based on the characterization of the data. The method further includes receiving a request to stop relaying data between the mobile endpoint and the mobility anchor point. The method also includes determining whether to forward the buffered data based on the characterization of the data.

In accordance with another embodiment, a system for selective buffering includes an interface operable to establish a first connection with a mobile endpoint. The first connection provides for an exchange of data with the mobile endpoint via a first point of connection. The mobile endpoint is coupled to the first point of connection via a second connection. The system also includes a processor coupled to the interface and operable to characterize the data exchanged with the mobile endpoint and to determine whether to buffer the data based on the characterization of the data. The interface is further operable to receive a request to transfer the mobile endpoint from the first point of connection to a second point of connection. The processor is further operable to determine whether to forward the buffered data to the second point of connection based on the characterization of the data.

In accordance with another embodiment, a system for selective buffering includes an interface operable to establish a first connection with a mobility anchor point and a second connection with a mobile endpoint. The interface is also operable to relay data between the mobile endpoint and the mobility anchor point. The system further includes a processor coupled to the interface and operable to characterize the data relayed between the mobile endpoint and the mobility anchor point and to determine whether to buffer the data based on the characterization of the data. The interface is further operable to receive a request to stop relaying data between the mobile endpoint and the mobility anchor point. The processor is further operable to determine whether to forward the buffered data based on the characterization of the data.

Certain embodiments may provide a number of technical advantages. For example, according to one embodiment of the present invention, data for a mobile endpoint may be buffered and/or forwarded depending on the type of data. Accordingly, data that may be discarded if forwarded (e.g., real-time data) is not buffered and/or forwarded, thereby decreasing the use of network resources.

Certain embodiments may enjoy some, all, or none of these advantages. Other technical advantages may be readily apparent to one skilled in the art from the following figures, description, and claims.

BRIEF DESCRIPTION OF THE DRAWINGS

To provide a more complete understanding of particular embodiments and features and advantages thereof, reference is made to the following description, taken in conjunction with the accompanying figures, wherein like reference numerals represent like parts, in which.

DESCRIPTION OF EXAMPLE EMBODIMENTS

Figure 1:
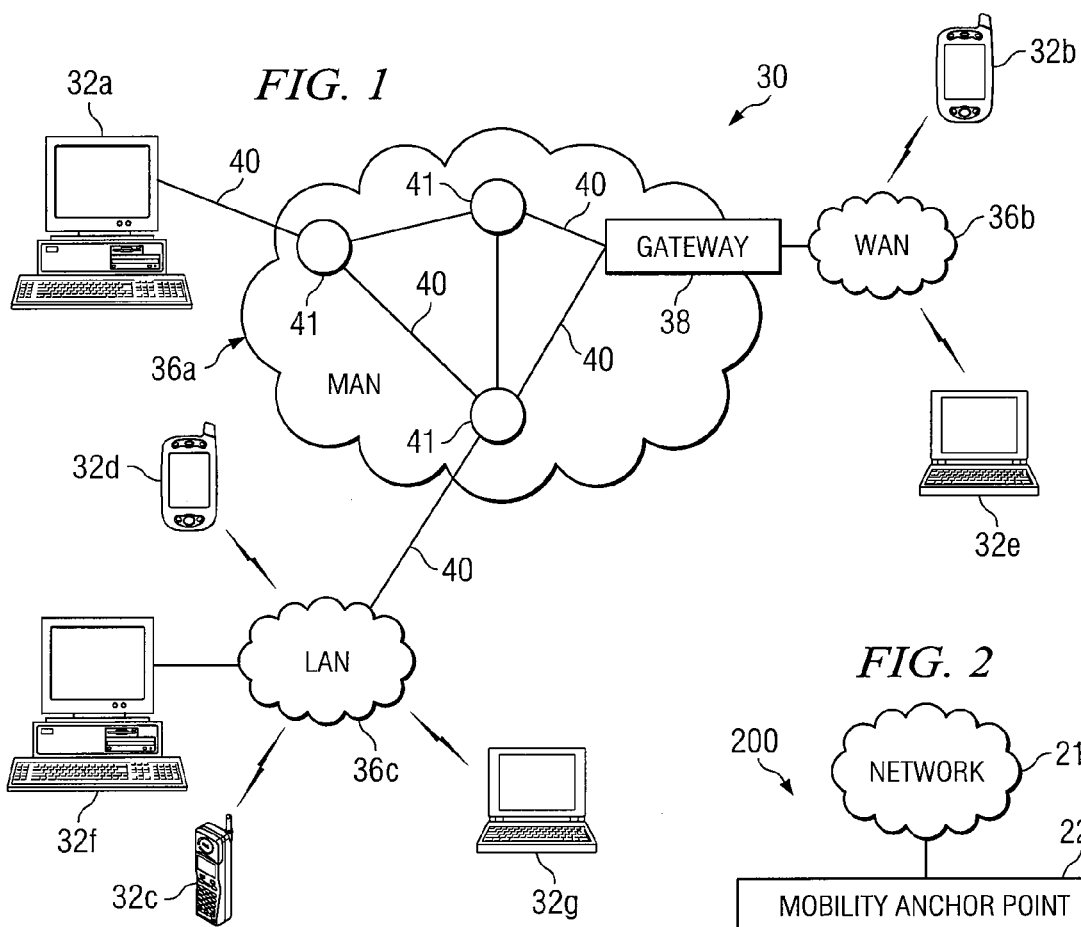
FIG. 1 is a simplified block diagram illustrating a network that may include a wireless network having multiple points of connection in accordance with one embodiment of the present invention.

FIG. 1 is a simplified block diagram illustrating network 30 that may include a wireless network having multiple points of connection in accordance with one embodiment of the present invention. Network 30 includes a plurality of endpoints 32a-32g having the ability to transmit and receive data and control signals between each other using one or more of sub-networks 36a-36c. Within each sub-network 36a-36c may be several nodes (e.g., nodes 41 of sub-network 36a) connected by various segments (e.g., segments 40 of sub-network 36a) that may aid in the facilitation of communicating data between endpoints. Network 30 also includes gateway 38 which may allow different sub-networks running different protocols to transfer data.

Any of sub-networks 36a-36c may include nodes, including points of connection for mobile endpoints, which provide endpoints with a wireless and/or wired connection to the sub-network, and to network 30. When a sub-network includes multiple points of connection there may arise a need to determine how to handle the handoff of a mobile endpoint as it passes from one point of connection to another.

Particular embodiments provide for handling the transfer of a mobile endpoint by buffering and/or forwarding data for the mobile endpoint in a selective manner. Therefore, resources of network 30 (and the sub-network to which the mobile endpoint is connected) are conserved by not always buffering and/or forwarding data for the mobile endpoint. For example, it may not be desirable to buffer and/or forward real-time data because any delay that may be caused by buffering and/or forwarding the data may detract from the user experience (e.g., create longer delays between responses).

In the illustrated embodiment, sub-network 36a is a metropolitan area network (MAN) that enables endpoints 32a-32g to pass data and control signaling between each other as well as allowing any intermediary components or devices to pass data and control signals. MAN 36a can be distributed across multiple cities and geographic regions. Sub-network 36b is a wide area network (WAN) similar to MAN 36a, though usually of a smaller scale, which couples endpoints 32b and 32e with one another and with MAN 36a. Sub-network 36c is a local area network (LAN) which couples endpoints 32c, 32d, 32f and 32g with MAN 36a. Accordingly, users of endpoints 32a-32g, may be able to send/receive data/control signals between and among each network component coupled to one or more of networks 36a-36c.

In the illustrated embodiment, network 30 may facilitate one or more different services. For example, network 30 may facilitate internet access, online gaming, file sharing, or any other type of functionality typically provided by a network. Network 30 may also facilitate a voice over internet protocol (VoIP) call between endpoints 32a and 32c, a video over IP call between endpoints 32a and 32f, or any other type of call typically provided via a network.

MAN 36a includes a plurality of segments 40 and nodes 41 that couple endpoint 32a and LAN 36c with gateway 38 and WAN 36b. Therefore, a user of endpoint 32a is provided with access to endpoints 32b-32g. Furthermore, endpoints 32a-32g, may all communicate data and control signals among each other. Nodes 41 may include any combination of network components, session border controllers, gatekeepers, call managers, conference bridges, routers, hubs, switches, gateways, endpoints, edgepoints, base stations, points of connection, mobility anchor points, or any other hardware, software, or embedded logic implementing any number of communication protocols that allow for the exchange of packets in communication system 30. WAN 36b and LAN 36c may include similar components and provide similar functionality as MAN 36a.

Network 30 may also include a plurality of edgepoints. An edgepoint may be a real-time transport protocol (RTP) media relay point that may be incorporated within one or more of the devices or components depicted in FIG. 1. For example, if nodes 41 were IP to IP gateways, then any of nodes 41 may include an edgepoint. An edgepoint may also be included in any other network component or device that may, in effect, define a boundary for a particular network, such as network 36a. Some other possible devices that may incorporate an edgepoint include a session border controller and a policy execution point. The use of an edgepoint may aid a network administrator in ascertaining the contribution of his network to any impairments a call may experience.

Although the illustrated embodiment includes three sub-networks 36a-36c, the terms "network" or "sub-network" should be interpreted as generally defining any network capable of transmitting audio and/or video telecommunication signals, data, and/or messages, including signals, data or messages transmitted through text chat, instant messaging and e-mail. Any one of sub-networks 36a-36c may be implemented as a local area network (LAN), wide area network (WAN), global distributed network such as the Internet, Intranet, Extranet, or any other form of wireless or wired networking. Generally, sub-network 36a provides for the communication of packets, cells, frames, or other portions of information (generally referred to as packets herein) between endpoints 32a-32g. MAN 36a may include any number and combination of segments 40, nodes 41 or endpoints 32a-32g.

In particular embodiments, MAN 36a employs protocols that allow for the addressing or identification of endpoints and/or nodes coupled to MAN 36a. For example, using Internet protocol (IP), each of the components coupled together by MAN 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets are included within the scope of the present invention.

MAN 36a may be directly coupled to other IP networks including, but not limited to, a LAN (e.g., LAN 36c), WAN (e.g., WAN 36b) or the Internet. Because IP networks share a common method of transmitting data, signals may be transmitted between devices located on different, but interconnected, IP networks. In addition to being coupled to other IP networks, MAN 36a may also be coupled to non-IP networks through the use of interfaces or components, for example gateway 38. IP networks transmit data by placing the data in packets and sending each packet individually to the selected destination, along one or more communication paths. Unlike a circuit-switched network (like a PSTN), a dedicated circuit is not required for the duration of a call or fax transmission over IP networks.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Endpoints 32c, 32d and 32g may be coupled to LAN 36c via a wireless connection and endpoints 32b and 32e may be coupled to WAN 36b via a wireless connection. Endpoint 32f may be coupled to LAN 36c via a standard wired connection. Endpoints 32b-32e and 32g may connect to sub-networks 36b or 36c, respectively, through a point of connection that may itself be connected to a mobility anchor point, gateway or any other appropriate type of node. In some embodiments, the point of connection may be an access router. The point of connection may, in particular embodiments, also be a base station, an access point, a gateway, a switch, a bridge, or any other device capable of providing one or more endpoints with a wireless connection to a network. In particular embodiments, the wireless connection may be done using Worldwide Interoperability for Microwave Access (WiMax) which allows wireless access over a large area (e.g., up to 31 miles). Depending on the embodiment, the wireless connection may also be IEEE 802.11b commonly known as wireless fidelity (WIFI), or it may utilize code division multiple access (CDMA), global system for mobile communications (GSM) (for use with cellular phones), universal mobile telecommunications system (UMTS), or any other type of wireless protocol.

It will be recognized that endpoints 32a-32g and/or gateway 38 may be any combination of hardware, software, and/or encoded logic that provides data or network services to a user. For example, endpoints 32a-32g may include an IP telephone, a video monitor, a camera, a personal data assistant, a cell phone or any other hardware, software and/or encoded logic that supports the communication of packets of media (or frames) using sub-networks 36a-36c. Endpoints 32a-32g may also include unattended or automated systems, gateways, other intermediate components or other devices that can send or receive data and/or signals. Although FIG. 1 illustrates a particular number and configuration of endpoints, segments, nodes, and gateways, network 30 contemplates any number or arrangement of such components for communicating data. In addition, elements of network 30 may include components centrally located (local) with respect to one another or distributed throughout network 30.

Figure 2:
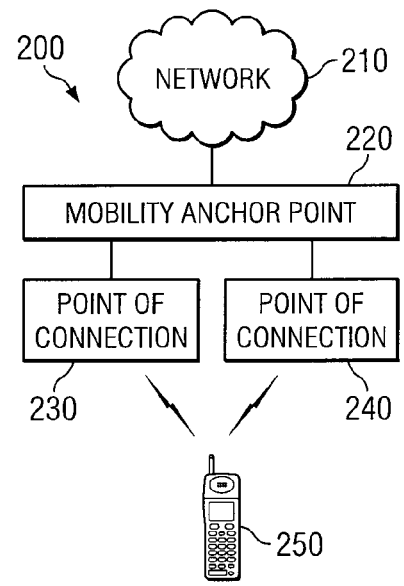
FIG. 2 is a simplified block diagram that illustrates two points of connection and a mobility anchor point of a wireless network in accordance with one embodiment of the present invention.

FIG. 2 is a simplified block diagram that illustrates two points of connection and a mobility anchor point of a wireless network in accordance with one embodiment of the present invention. Sub-network 200 depicts an example network in which mobility anchor point (MAP) 220 couples point of connections (POCs) 230 and 240 to network 210. In particular embodiments sub-network 200 may be an IP network. Network 210 may be one or more of any of the networks discussed or mentioned above with respect to FIG. 1 (e.g., a LAN, a WAN, a global distributed network such as the Internet, Intranet, Extranet, or any other form of wireless or wireline networking). POCs 230 and 240 may provide wireless access to network 210. For example, POCs 230 and 240 may be access routers. In some embodiments, POCs 230 and 240 may be base stations, access points, gateways, switches, bridges, or any other devices capable of providing one or more endpoints with a wireless connection to a network. In particular embodiments, the wireless connection may be facilitated via Worldwide Interoperability for Microwave Access (WiMax) which allows wireless access over a large area (e.g., up to 31 miles). Depending on the embodiment, the wireless connection may also be IEEE 802.11b commonly known as wireless fidelity (WIFI), or it may utilize code division multiple access (CDMA), global system for mobile communications (GSM) (for use with cellular phones), universal mobile telecommunications system (UMTS), or any other type of wireless protocol.

Each POC, 230 and 240, may have a certain domain associated with it. The domain may be the area that the POC is capable of servicing (e.g., the area in which its wireless signal is sufficiently strong). To ensure that there are no gaps in coverage, it may be that at least a portion of the domain of POC 230 overlaps the domain of POC 240. Any given endpoint capable of transmitting or receiving data (using a protocol recognized by a POC) may, at any particular time, be connected to a single POC. When an endpoint associated with a particular POC, for example POC 230, moves from the domain of POC 230 into the domain of another POC, such as POC 240, it may become necessary to transfer the endpoint from POC 230 to POC 240. In some embodiments MAP 220 may decide when to transfer an endpoint.

In order to help illustrate some of the features and benefits of the present invention, endpoint 250 has been depicted as being between POCs 230 and 240. Accordingly, endpoint 250 may initially have a connection with POC 230 and but then may end up with a connection with POC 240. Endpoint 250 may be any mobile endpoint capable of sending or receiving data wirelessly. In some embodiments endpoint 250 may support IP.

To begin, endpoint 250 and POC 230 may have a connection. MAP 220 may determine that endpoint 250 should be associated with POC 230 based on, for example, the strength of a signal between endpoint 250 and POC 230. At some point, endpoint 250 may move. This movement may not in itself trigger any changes in how endpoint 250, POC 230, or MAP 220 route data for endpoint 250 (data for an endpoint may include both data sent to the endpoint and data received from the endpoint). However, should endpoint 250 move towards the domain of POC 240, his signal may eventually become strong enough with POC 240 to warrant transferring endpoint 250 from POC 230 to POC 240.

In some embodiments MAP 220 and/or POC 230 may buffer and/or forward data for endpoint 250 under certain conditions. More specifically, MAP 220 and/or POC may be provisioned with certain policies that determine when to buffer and/or forward data for an endpoint. The provisioned policies may include conditions related to the type of data, the path or route the data takes, the user or endpoint receiving the data or any other factor that may be a desirable consideration to use in determining when to buffer/forward data. For example, the policies may stipulate not to buffer and/or forward data for a mobile endpoint if the data is real-time data, time-sensitive data or delay sensitive data. Another example policy may be to restrict buffering/forwarding of data based on certain classes of users (e.g., upper management or sales) or particular users. Another example may be policies that limit buffering/forwarding data based on what resources of sub-network 200 are used in transmitting the data (e.g., the data path, destination, source or ports).

In order to achieve the teachings discussed herein, software and/or hardware may reside within POCs 230 and 240 and/or MAP 220. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of POCs 230 and 240 and MAP 220 in the context of mobile communication network 200 and, accordingly, it should be construed as such.

It will be recognized by those of ordinary skill in the art that network 200 is merely an example configuration of a wireless network in which buffering and/or forwarding may be used in handing-off a mobile endpoint, in accordance with an embodiment of the present invention. Other endpoints may include any number of MAPs, POCs, endpoints, networks, and/or other components to accomplish the functionality and features described herein. For example, although network 200 is illustrated and described as including MAP 220 and POCs 230 and 240, other embodiments may have multiple MAPs, with one or more POCs coupled to each MAP.

Figure 3:
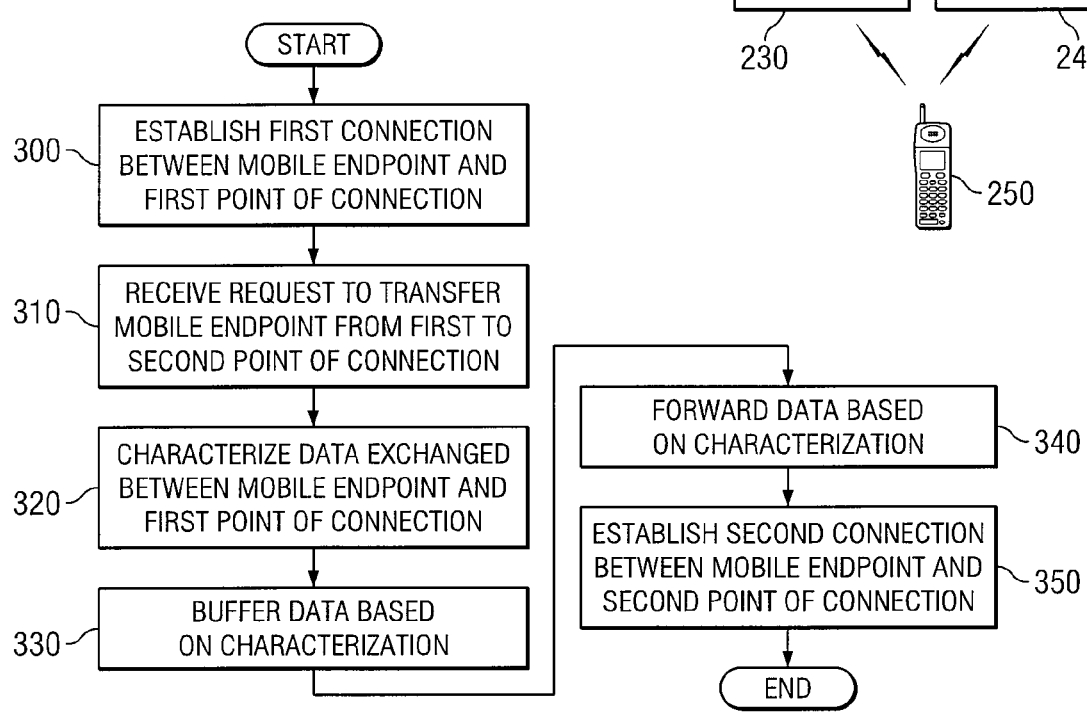
FIG. 3 is a flowchart depicting a method for selectively buffering data in a wireless network in accordance with particular embodiments of the present invention.

FIG. 3 is a flowchart depicting a method for selectively buffering data in a wireless network in accordance with particular embodiments of the present invention. The method begins at step 300 where a first connection is established between a mobile endpoint and a first point of connection (POC). The connection may be a wireless connection using any suitable wireless protocol, such as 802.11, 802.11b (WIFI), 802.11g, 802.16 (WiMax), CDMA, GSM, UMTS, or any other type of wireless protocol. This connection may be maintained until the strength of the wireless signal between the mobile endpoint and the first POC becomes sufficiently weak enough and the signal strength between the mobile endpoint and the second POC becomes strong enough to warrant transferring the mobile endpoint to the second POC.

When the strength of the signals is such that it is time to make the transfer, at step 310 a request to transfer the mobile endpoint from the first POC to the second POC is received. This request may come, for example, from the mobile endpoint or one of the POCs.

When the mobile endpoint is transferred between POCs it may be that some of the data for the mobile endpoint may become lost or out of order during the transition. To reduce the likelihood of losing data or having data in an incorrect order, the data may be buffered. The data may be buffered at, for example, the first POC and/or at a mobility anchor point. The first POC may be functionally located between the mobility anchor point and the mobile endpoint. Furthermore, the buffered data may be forwarded to the second POC when it is time to transfer the mobile endpoint.

As may be apparent both buffering the data and forwarding may cause delays and it requires using a certain amount of resources. Furthermore, the use of these resources may be wasted where the buffered or forwarded data is ultimately discarded. For example, where the data is some form of real-time data, the delay caused by buffering and forwarding may create an undesirable user experience.

To help reduce wasting resources on buffering and/or forwarding data that ultimately is not used, at step 320 the data being exchanged between the mobile endpoint and the first POC is characterized and at steps 330 and 340, the data is only buffered and forwarded if certain conditions of a policy have been fulfilled. The data may be characterized according to the service it provides, the route or path the data takes in getting to the mobile endpoint, a profile associated with either the user or the endpoint, or any other consideration that may be advantageous in determining whether to use network resources to buffer and/or forward a certain type of data for a particular mobile endpoint.

Based on the conditions and policies that are in place it may be that data is buffered but not forwarded, or buffered and forwarded, or buffered at a single point or buffered at multiple points. Depending on the embodiment, the conditions and policies may be stored within the POC and/or the MAP.

Regardless of whether or not the data has been buffered and/or forwarded, a connection is still established between the mobile endpoint and the second POC. Either as the second connection is being formed or shortly there after, the first connection between the mobile endpoint and the first POC is terminated.

Some of the steps illustrated in FIG. 3 may be combined, modified or deleted where appropriate, and additional steps may be added to the flowchart. Additionally, steps may be performed in any suitable order without departing from the scope of the invention.

As indicated above, technical advantages of particular embodiments include methods and systems that enable selective buffering/forwarding of data for a mobile endpoint during handoff between two points of connection. This allows for greater control of the resources that are used to buffer and store data.

Although particular embodiments have been described in detail, it should be understood that various other changes, substitutions, and alterations may be made hereto without departing from the spirit and scope of the present invention. For example, although some embodiments have been described with reference to a number of elements included within network 30 these elements may be combined, rearranged or positioned in order to accommodate particular routing architectures or needs. In addition, any of these elements may be provided as separate external components to communication system 30. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for selective buffering, comprising:
   establishing a first connection with a mobile endpoint, the first connection providing for an exchange of data with the mobile endpoint via a first point of connection, the mobile endpoint coupled to the first point of connection via a second connection;
   characterizing the data exchanged with the mobile endpoint as time sensitive data;
   determining whether to buffer the data based on the characterization of the data according to a policy configured at a network node distinct from the mobile endpoint;
   receiving a request to transfer the mobile endpoint from the first point of connection to a second point of connection; and upon the data being buffered based on the characterization of the data, determining whether to forward the buffered data to the second point of connection based on the characterization of the data.

2. The method of claim 1, further comprising:
buffering the data locally; and
sending a request to the first point of connection requesting that the first point of connection buffer the data.

3. The method of claim 1, wherein determining whether to buffer the data based on the characterization of the data comprises determining whether to buffer the data at the first point of connection and locally, or at the first point of connection, or locally, or neither locally nor at the first point of connection, based on the characterization of the data.

4. The method of claim 1, wherein characterizing the data exchanged with the mobile endpoint comprises characterizing a type of service provided via the data.

5. The method of claim 4, wherein the data is buffered if the type of service provided is a service selected from the group consisting of a time-insensitive service and a delay insensitive service.

6. The method of claim 1, wherein characterizing the data exchanged with the mobile endpoint comprises characterizing the data exchanged with the mobile endpoint using a resource selected from the group consisting of a link layer procedure, a policy lookup, and at least one local configuration decision.

7. The method of claim 1, wherein at least a portion of the buffered data is not forwarded based on the characterization of the data.

8. The method of claim 1:
further comprising characterizing a route associated with the data exchanged with the mobile endpoint;
wherein determining whether to forward the buffered data to the second point of connection is further based on the characterized route associated with the data exchanged with the mobile endpoint.

9. The method of claim 1:
further comprising characterizing a profile associated with the data exchanged with the mobile endpoint;
wherein determining whether to forward the buffered data to the second point of connection is further based on the characterized profile associated with the data exchanged with the mobile endpoint.

10. A method for selective buffering, comprising:
establishing a first connection with a mobility anchor point and a second connection with a mobile endpoint;
relaying data between the mobile endpoint and the mobility anchor point;
characterizing the data relayed between the mobile endpoint and the mobility anchor point as time sensitive data;
determining whether to buffer the data based on the characterization of the data according to a policy configured at a network node distinct from the mobile endpoint;
receiving a request to stop relaying data between the mobile endpoint and the mobility anchor point; and
upon the data being buffered based on the characterization of the data, determining whether to forward the buffered data based on the characterization of the data.

11. The method of claim 10, further comprising:
buffering the data locally; and
sending a request to the mobility anchor point requesting that the mobility anchor point buffer the data.

12. The method of claim 10, wherein determining whether to buffer the data based on the characterization of the data comprises determining whether to buffer the data locally and at a mobility anchor point, or locally, or at the mobility anchor point, or neither locally nor at the mobility anchor point, based on the characterization of the data.

13. The method of claim 10, wherein characterizing the data relayed between the mobile endpoint and the mobility anchor point comprises characterizing a type of service provided via the data.

14. The method of claim 13, wherein the data is buffered if the type of service provided is a service selected from the group consisting of a time-insensitive service and a delay insensitive service.

15. The method of claim 10, wherein characterizing the data exchanged with the mobile endpoint comprises characterizing the data exchanged with the mobile endpoint using a resource selected from the group consisting of a link layer procedure, a policy lookup, and at least one local configuration decision.

16. A system for selective buffering, comprising:
an interface operable to establish a first connection with a mobile endpoint, the first connection providing for an exchange of data with the mobile endpoint via a first point of connection, the mobile endpoint coupled to the first point of connection via a second connection;
a processor coupled to the interface and operable to:
characterize the data exchanged with the mobile endpoint as time sensitive data; and
determine whether to buffer the data based on the characterization of the data according to a policy configured at a network node distinct from the mobile endpoint;
wherein the interface is further operable to receive a request to transfer the mobile endpoint from the first point of connection to a second point of connection and upon the data being buffered based on the characterization of the data, the processor is further operable to determine whether to forward the buffered data to the second point of connection based on the characterization of the data.

17. The system of claim 16, wherein the processor is further operable to buffer the data locally and the interface is further operable to send a request to the first point of connection requesting that the first point of connection buffer the data.

18. The system of claim 16, wherein the processor operable to determine whether to buffer the data based on the characterization of the data comprises a processor operable to determine whether to buffer the data at the first point of connection and locally, or at the first point of connection, or locally, or neither locally nor at the first point of connection, based on the characterization of the data.

19. The system of claim 16, wherein the processor operable to characterize the data exchanged with the mobile endpoint comprises a processor operable to characterize a type of service provided via the data.

20. The system of claim 19, wherein the data is buffered if the type of service provided is a service selected from the group consisting of a time-insensitive service and a delay insensitive service.

21. The system of claim 16, wherein the processor operable to characterize the data exchanged with the mobile endpoint comprises a processor operable to characterize the data exchanged with the mobile endpoint using a resource selected from the group consisting of a link layer procedure, a policy lookup, and at least one local configuration decision.

22. A system for selective buffering, comprising:
an interface operable to:
establish a first connection with a mobility anchor point and a second connection with a mobile endpoint; and relay data between the mobile endpoint and the mobility anchor point; and a processor coupled to the interface and operable to:
characterize the data relayed between the mobile endpoint and the mobility anchor point as time sensitive data; and
determine whether to buffer the data based on the characterization of the data according to a policy configured at a network node distinct from the mobile endpoint;
wherein the interface is further operable to receive a request to stop relaying data between the mobile endpoint and the mobility anchor point and upon the data being buffered based on the characterization of the data, the processor is further operable to determine whether to forward the buffered data based on the characterization of the data.

23. The system of claim 22, wherein the processor is further operable to buffer the data locally and the interface is further operable to send a request to the mobility anchor point requesting that the mobility anchor point buffer the data.

24. The system of claim 22, wherein the processor operable to determine whether to buffer the data based on the characterization of the data comprises a processor operable to determine whether to buffer the data locally and at a mobility anchor point, or locally, or at the mobility anchor point, or neither locally nor at the mobility anchor point, based on the characterization of the data.

25. The system of claim 22, wherein the processor operable to characterize the data relayed between the mobile endpoint and the mobility anchor point comprises a processor operable to characterize a type of service provided via the data.

26. The system of claim 25, wherein the data is buffered if the type of service provided is a service selected from the group consisting of a time-insensitive service and a delay insensitive service.

27. The system of claim 22, wherein the processor operable to characterize the data exchanged with the mobile endpoint comprises a processor operable to characterize the data exchanged with the mobile endpoint using a resource selected from the group consisting of a link layer procedure, a policy lookup, and at least one local configuration decision.

28. Logic embodied in a non-transitory computer readable medium, the computer readable medium comprising code operable to:
establish a first connection with a mobile endpoint, the first connection providing for an exchange of data with the mobile endpoint via a first point of connection, the mobile endpoint coupled to the first point of connection via a second connection;
characterize the data exchanged with the mobile endpoint as time sensitive data;
determine whether to buffer the data based on the characterization of the data according to a policy configured at a network node distinct from the mobile endpoint;
receive a request to transfer the mobile endpoint from the first point of connection to a second point of connection; and
upon the data being buffered based on the characterization of the data, determine whether to forward the buffered data to the second point of connection based on the characterization of the data.

29. The medium of claim 28, wherein the code is further operable to:
buffer the data locally; and
send a request to the first point of connection requesting that the first point of connection buffer the data.

30. The medium of claim 28, wherein the code operable to determine whether to buffer the data based on the characterization of the data comprises code operable to determine whether to buffer the data at the first point of connection and locally, or at the first point of connection, or locally, or neither locally nor at the first point of connection, based on the characterization of the data.

31. The medium of claim 28, wherein the code operable to characterize the data exchanged with the mobile endpoint comprises code operable to characterize a type of service provided via the data.

32. The medium of claim 31, wherein the data is buffered if the type of service provided is a service selected from the group consisting of a time-insensitive service and a delay insensitive service.

33. The medium of claim 28, wherein the code operable to characterize the data exchanged with the mobile endpoint comprises code operable to characterize the data exchanged with the mobile endpoint using a resource selected from the group consisting of a link layer procedure, a policy lookup, and at least one local configuration decision.

34. Logic embodied in a non-transitory computer readable medium, the computer readable medium comprising code operable to:
establish a first connection with a mobility anchor point and a second connection with a mobile endpoint;
relay data between the mobile endpoint and the mobility anchor point;
characterize the data relayed between the mobile endpoint and the mobility anchor point as time sensitive data;
determine whether to buffer the data based on the characterization of the data according to a policy configured at a network node distinct from the mobile endpoint;
receive a request to stop relaying data between the mobile endpoint and the mobility anchor point; and
upon the data being buffered based on the characterization of the data, determine whether to forward the buffered data based on the characterization of the data.

35. The medium of claim 34, wherein the code is further operable to:
buffer the data locally; and
send a request to the mobility anchor point requesting that the mobility anchor point buffer the data.

36. The medium of claim 34, wherein the code operable to determine whether to buffer the data based on the characterization of the data comprises code operable to determine whether to buffer the data locally and at a mobility anchor point, or locally, or at the mobility anchor point, or neither locally nor at the mobility anchor point, based on the characterization of the data.

37. The medium of claim 34, wherein the code operable to characterize the data relayed between the mobile endpoint and the mobility anchor point comprises code operable to characterize a type of service provided via the data.

38. The medium of claim 37, wherein the data is buffered if the type of service provided is a service selected from the group consisting of a time-insensitive service and a delay insensitive service.

39. The medium of claim 37, wherein the code operable to characterize the data exchanged with the mobile endpoint comprises code operable to characterize the data exchanged with the mobile endpoint using a resource selected from the group consisting of a link layer procedure, a policy lookup, and at least one local configuration decision.

40. A system for selective buffering, comprising:
means for establishing a first connection with a mobile endpoint, the first connection providing for an exchange of data with the mobile endpoint via a first point of connection, the mobile endpoint coupled to the first point of connection via a second connection;
means for characterizing the data exchanged with the mobile endpoint as time sensitive data;
means for determining whether to buffer the data based on the characterization of the data according to a policy configured at a network node distinct from the mobile endpoint;
means for receiving a request to transfer the mobile endpoint from the first point of connection to a second point of connection; and
means for, upon the data being buffered based on the characterization of the data, determining whether to forward the buffered data to the second point of connection based on the characterization of the data.

41. A method for selective buffering, comprising:
means for establishing a first connection with a mobility anchor point and a second connection with a mobile endpoint;
means for relaying data between the mobile endpoint and the mobility anchor point;
means for characterizing the data relayed between the mobile endpoint and the mobility anchor point as time sensitive data;
means for determining whether to buffer the data based on the characterization of the data according to a policy configured at a network node distinct from the mobile endpoint;
means for receiving a request to stop relaying data between the mobile endpoint and the mobility anchor point; and
means for, upon the data being buffered based on the characterization of the data, determining whether to forward the buffered data based on the characterization of the data.

* * * * *